Feb. 24, 1970     K. M. KOSANKE ET AL     3,497,284
ACHROMATIC LIGHT DEFLECTOR
Filed Jan. 16, 1967
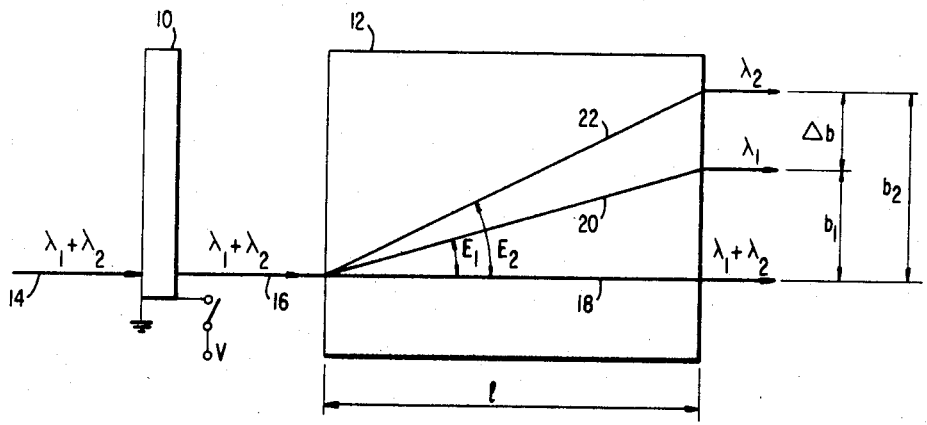
FIG. 1 PRIOR ART
FIG. 2
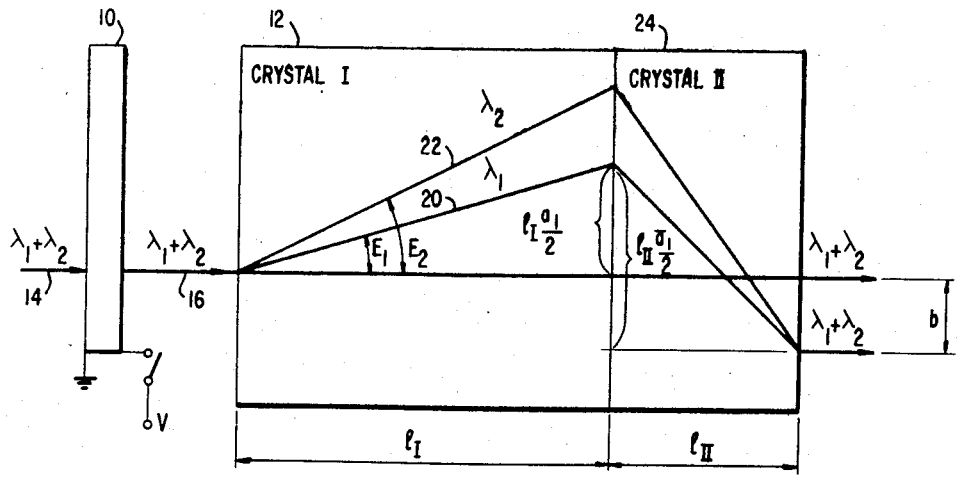
INVENTORS
KURT M. KOSANKE
WERNER W. KULCKE
ERHARD MAX
BY *Sughrue, Rothwell, Mion, Zinn & Macpeak*
ATTORNEYS

United States Patent Office 3,497,284
Patented Feb. 24, 1970

3,497,284
ACHROMATIC LIGHT DEFLECTOR
Kurt M. Kosanke and Werner W. Kulcke, Boblingen, and Erhard Max, Sindelfingen, Germany, assignors to International Business Machines Corporation, Armonk, N.Y., a corporation of New York
Filed Jan. 16, 1967, Ser. No. 609,667
Int. Cl. G02f 3/00, 1/26; G02b 5/30
U.S. Cl. 350—150       7 Claims

ABSTRACT OF THE DISCLOSURE

A compensated birefringent crystal for use in a stage of a digital deflector whereby plural wavelengths passing through the compensated crystal are each deflected the same distance. A linearly polarized light beam containing at least two wavelengths is incident upon a first birefringent crystal which deflects the extraordinary rays of the two wavelengths different distances. The separated wavelengths at the output of the first crystal are incident upon a second crystal having complementary deflecting characteristics relative to the first crystal. The second crystal also deflects both wavelengths through different distances. However, the dimensions and birefringence characteristics of the first and second crystals are chosen so that the resultant deflection of both wavelengths is the same after passing through both crystals.

SUMMARY OF THE INVENTION

This invention relates generally to digital light deflectors and more particularly to a compensated digital light deflector in which two coincident plural wavelength beams are simultaneously passed through a deflector stage which deflects both wavelengths substantially the same distance.

The invention may be broadly summarized as an achromatic light deflector consisting of two birefringent crystals whose birefringent characteristics and dimensions are chosen such that the extraordinary rays of the plural wavelengths of an incident light beam are deflected the same distance after passing through both crystals.

Other objects, features and advantages of the invention will be apparent from the following more particular description of a preferred embodiment of the invention, as illustrated in the accompanying drawings.

FIGURE 1 is a schematic diagram of a prior art deflector in which the extraordinary rays of two wavelengths of an incident light beam are deflected through different distances; and FIGURE 2 is a schematic diagram of a preferred embodiment of this invention whereby both extraordinary rays are deflected the same distance.

FIGURE 1 illustrates one stage of a prior art digital light deflector. This stage comprises an electro-optical polarizing crystal 10 and a birefringent crystal 12. An incident light beam 14 containing two different wavelengths $\lambda_1$ and $\lambda_2$ may be linearly polarized in either of two perpendicular directions by the electro-optical crystal 10. If the linear polarization is in one direction, the light beam 16 passes through the birefringent crystal without deflection as the ordinary ray 18. In this case, both wavelengths remain colinear and leave the crystal at the same place.

However, if crystal 10 linearly polarizes the beam 16 in the other perpendicular direction, the light beam consisting of wavelengths $\lambda_1$ and $\lambda_2$ travels as two extraordinary rays 20 and 22 respectively. Because of the wavelength dispersion of the splitting angles $E_1$ and $E_2$, the extraordinary rays of the two wavelengths are separated. The separation depends on the material of the crystal, on the wavelength separation $\lambda_1-\lambda_2$, and on the dimensions of the birefringent crystal 12. The tangent of the angle E between the ordinary and extraordinary beams for any given wavelength for maximum separation is:

$$\tan E = -\frac{n_o^2 - n_e^2}{2n_o n_e} = -\frac{1}{2}\left(\frac{n_o}{n_e} - \frac{n_e}{n_o}\right) = \frac{a}{2} \quad (1)$$

where $n_o$ is the ordinary index of refraction and $n_e$ is the extraordinary one of the birefringent material. The separation between the two beams in a crystal of a length $l$ is:

$$b = l\frac{a}{2} \quad (2)$$

As $n_o$ and $n_e$ depend on the wavelength of the light, the two beams are separated from the ordinary beam position by different amounts $$\text{for } \lambda_1 \quad b_1 = l\frac{a_1}{2} \quad (3)$$

$$\text{for } \lambda_2 \quad b_2 = l\frac{a_2}{2} \quad (4)$$

and the difference in deflection is $$\Delta b = b_1 - b_2 = \frac{1}{2}(a_2 - a_1) \quad (5)$$

This wavelength dispersion of the indices of refraction is different in different materials. The maximum splitting angle E between the ordinary and extraordinary ray is also different for different wavelengths. In the preferred embodiment of this invention, both of these effects are used to produce an achromatic deflector in which the wavelength or color separation of the extraordinary rays can be completely compensated for two different wavelengths by arranging two birefringent crystals in the manner illustrated in FIGURE 2.

Corresponding elements of FIGURE 1 and FIGURE 2 carry the same reference numerals. Incident light beam 14 is passed through electro-optical crystal 10 which produces a beam 16 linearly polarized such that it travels as an extraordinary ray in the crystal 12. Again, the light beam is assumed to consist of two wavelengths $\lambda_1$ and $\lambda_2$. Another crystal 24 of different material is placed adjacent crystal 12 so that the extraordinary rays 22 and 20 are incident upon crystal 24 as they leave crystal 12. Crystals 12 and 24 will also be identified as crystals I and II, respectively, to facilitate understanding the following equations. The length of crystal I is indicated as $l_\text{I}$ and the length of crystal II is $l_\text{II}$.

In crystal I the two wavelengths are deflected upward generating a difference in deflection $$\Delta b = \frac{l_\text{I}}{2}(a_2 - a_1) \quad (6)$$

crystal II is deflecting in the opposite direction with a difference in deflection $$\Delta b = \frac{l_\text{II}}{2}(\bar{a}_2 - \bar{a}_1) \quad (7)$$

For compensation both have to be equal which leads to $$l_\text{II} = \frac{a_2 - a_1}{\bar{a}_2 - \bar{a}_1} l_\text{I} \quad (8)$$

The resulting deflection of the compensated unit is $$b = l_\text{I}\frac{a_1}{2} - l_\text{II}\frac{\bar{a}_1}{2} = l_\text{I}\frac{a_2}{2} - l_\text{II}\frac{\bar{a}_2}{2} \quad (9)$$

As a specific example, let us choose $\lambda_1$ as 6328 A. and $\lambda_2$ as 4500 A. Let us choose one crystal material as $CaCO_3$ and the other crystal material as $NaNO_3$. Table I lists the different properties of the two materials.

3,497,284

TABLE I

| | λ(A) | $n_o$ | $n_e$ | $a$ | $\bar{a}_2 - \bar{a}_1$ |
|---|---|---|---|---|---|
| $CaCO_3$ | 4,500 | 1.6726 | 1.4932 | 0.2274 | .0094 |
| | 6,328 | 1.6560 | 1.4853 | 0.2180 | |
| $NaNO_3$ | 4,500 | 1.6085 | 1.3394 | 0.36821 | .02849 |
| | 6,328 | 1.5803 | 1.3345 | 0.33972 | |

Using the equations given above the ratio of crystal lengths is $$\frac{l_I}{l_{II}} = \frac{\bar{a}_2 - \bar{a}_1}{a_2 - a_1} = 3.03 \tag{10}$$

and the deflection $$b = \frac{1}{2}(a_1 l_I - \bar{a}_1 l_{II}) = \frac{l_I}{2}\left(a_1 - \frac{\bar{a}_1}{3.03}\right)$$

$$= \frac{1}{2}\left(a_1 - \frac{\bar{a}_1}{3.03}\right)\left(\frac{3.03}{1+3.03}\right)(l_1 + l_2) = 0.04(l_1 + l_2) \tag{11}$$

The deflection for an uncompensated deflector consisting of a single crystal of $CaCO_3$ for a wavelength of $\lambda = 6328$ A. is 0.109 $l$. A comparison of the lengths required for the uncompensated deflector and the compensated deflector (Equation 11) shows that the length necessary for a compensated deflector for the same amount of deflection is 2.5 times the length of an uncompensated one as far as the birefringent crystal is concerned. However, the actual length ratio for a complete deflector stage is smaller because of the fact that the space for the electro-optic crystal 10 will be the same for both the compensated and uncompensated stage.

In the specific example given above, $CaCO_3$ and $NaNO_3$ are both negative birefringent crystals with their optic axes 180° apart. Obviously, two positive birefringent crystals could be used, again with their optic axes 180° apart. Alternatively, one positive birefringent crystal and one negative birefringent crystal with their optic axes in the same direction could be used.

While the invention has been particularly shown and described with reference to a preferred embodiment thereof, it will be understood by those skilled in the art that various changes in form and details may be made therein without departing from the spirit and scope of the invention.

What is claimed is:
1. An achromatic split angle light deflector for deflecting a polarized light beam containing at least two wavelengths and propagated as a set of extraordinary rays from a first point to a second point comprising
    (a) a first birefringent crystal which deflects the wavelengths through different distances in a first direction so that the wavelengths appear at the output of said first crystal at different points, and
    (b) a second birefringent crystal adjacent the output of said first crystal so that the separated wavelengths at the output of said first crystal are incident upon said second crystal, said second crystal deflecting both wavelengths through different distances in a direction opposite to said first direction so that the wavelengths at the output of said second crystal are colinear.

2. An achromatic light deflector as defined in claim 1 further comprising electro-optic crystal means for linearly polarizing said light beam in a direction such that it passes through said first and second crystals as an extraordinary ray.

3. An achromatic light deflector as defined in claim 1 wherein said wavelengths are $\lambda_1$ and $\lambda_2$, said first birefringent crystal has a length $l_I$, and said second birefringent crystal has a length $l_{II}$ which is equal to $$\frac{a_2 - a_1}{\bar{a}_2 - \bar{a}_1} l_I$$

where $a_1$ and $\bar{a}_1$ correspond to $\lambda_1$ in the first and second birefringent crystals, respectively, $a_2$ and $\bar{a}_2$ correspond to $\lambda_2$ in the first and second birefringent crystals, respectively, and $a$ is defined by the expression $$\frac{n_e - n_o}{n_o - n_e}$$

where $n_o$ is the ordinary index of refraction and $n_e$ is the extraordinary index of refraction of the birefringent material.

4. An achromatic light deflector as defined in claim 3 wherein said first birefringent crystal is $CaCO_3$, said second birefringent crystal is $NaNO_3$, $\lambda_1$ is 6328 A., $\lambda_2$ is 4500 A., and the ratio of $l_I$ to $l_{II}$ is 3.03.

5. An achromatic light deflector as defined in claim 1, wherein said first and second birefringent crystals are both negative birefringent crystals with their optic axes 180° apart.

6. An achromatic light deflector as defined in claim 1 wherein said first and second birefringent crystals are both positive birefringent crystals with their optic axes 180° apart.

7. An achromatic light deflector as defined in claim 1 wherein said first and second birefringent crystals are one positive birefringent crystal and one negative birefringent crystal with their optic axes in the same direction.

References Cited

UNITED STATES PATENTS 3,391,972  7/1968  Harris et al. _____ 350—150

Jenkins & White "Fundamentals of Optics" 3d edition McGraw-Hill Book Co., Inc. (1957) pp. 157–163.

Kulcke et al., "Digital Light Deflectors" Applied Optics, vol. 5, No. 10, (October, 1966) pp. 1657–1667.

DAVID SCHONBERG, Primary Examiner

U.S. Cl. X.R.

350—147, 157, 158, 175